United States Patent
Hayzen et al.

(10) Patent No.: US 11,243,860 B2
(45) Date of Patent: Feb. 8, 2022

(54) TREND PLOT WITH MULTIPLE ACQUISITIONS

(71) Applicant: Computational Systems, Inc., Knoxville, TN (US)

(72) Inventors: Anthony J. Hayzen, Knoxville, TN (US); Christopher G. Hilemon, Knoxville, TN (US)

(73) Assignee: Computational Systems, Inc., Knoxville, TN (US)

(*) Notice: Subject to any disclaimer, the term of this patent is extended or adjusted under 35 U.S.C. 154(b) by 135 days.

(21) Appl. No.: 16/589,211

(22) Filed: Oct. 1, 2019

(65) Prior Publication Data

US 2021/0096972 A1    Apr. 1, 2021

(51) Int. Cl.
| | |
|---|---|
| *G06T 11/20* | (2006.01) |
| *G06F 11/30* | (2006.01) |
| *G01H 17/00* | (2006.01) |
| *G06F 17/18* | (2006.01) |

(52) U.S. Cl.
CPC ......... *G06F 11/3058* (2013.01); *G01H 17/00* (2013.01); *G06F 17/18* (2013.01); *G06T 11/206* (2013.01)

(58) Field of Classification Search
CPC ..... G06F 11/3058; G06F 17/18; G01H 17/00; G06T 11/206
See application file for complete search history.

(56) References Cited

U.S. PATENT DOCUMENTS

| | | | |
|---|---|---|---|
| 5,109,700 A | * | 5/1992 | Hicho .................... F04C 28/28 |
| | | | 73/602 |
| 6,421,571 B1 | | 7/2002 | Spriggs et al. |
| 6,577,323 B1 | | 6/2003 | Jamieson et al. |
| 6,587,108 B1 | | 7/2003 | Guerlain et al. |
| 6,687,596 B2 | | 2/2004 | Humerickhouse et al. |
| 7,676,287 B2 | * | 3/2010 | Eryurek ............. G05B 23/0221 |
| | | | 700/83 |
| 8,707,193 B2 | * | 4/2014 | Khazanov .......... G05B 23/0264 |
| | | | 715/771 |
| 9,477,223 B2 | | 10/2016 | Shaikh et al. |
| 10,725,463 B1 | * | 7/2020 | Dixit ........................ G06N 3/04 |
| 2015/0032389 A1 | * | 1/2015 | Hedin ................. G01M 13/045 |
| | | | 702/34 |
| 2016/0215432 A1 | * | 7/2016 | Kim ........................ D06F 33/48 |
| 2017/0030349 A1 | * | 2/2017 | Bassett ................... F04B 53/10 |
| 2017/0219461 A1 | * | 8/2017 | Duncan .............. G01M 99/008 |

(Continued)

*Primary Examiner* — Eyob Hagos
(74) *Attorney, Agent, or Firm* — Luedeka Neely Group, P.C.; Rick Barnes

(57) ABSTRACT

A computerized apparatus for presenting vibration data that is read under different conditions as a single trend line on a chart. A sensor measures vibration and produces vibration data. A memory stores the vibration data, an indicator of the condition under which the vibration data was produced, and a type associated with the vibration data. A processor reads the vibration data, the condition, and the type from the memory, and selectively plots the vibration data on the trend line when the type of the vibration data matches a given value, even though the condition might be different from data point to data point on the trend line. The processor selectively creates a flag indicating a condition change, and an interface presents a plot of the trend line, and the flag when a condition change occurs between data points.

13 Claims, 4 Drawing Sheets

(56) References Cited

U.S. PATENT DOCUMENTS

| | | | | |
|---|---|---|---|---|
| 2018/0011065 A1* | 1/2018 | Bowers, III | ........... | G01N 29/50 |
| 2018/0181086 A1* | 6/2018 | Kostyukov | ......... | G01M 99/005 |
| 2018/0283987 A1* | 10/2018 | Hedin | ................. | G01M 99/008 |
| 2018/0321836 A1* | 11/2018 | Tappan | .............. | G05B 23/0272 |
| 2018/0364132 A1* | 12/2018 | Knaup | ................. | G05B 19/406 |
| 2019/0179281 A1* | 6/2019 | Fang | .................... | G08B 21/182 |

\* cited by examiner

TREND PLOT WITH MULTIPLE ACQUISITIONS

FIELD

This invention relates to the field of data charting. More particularly, this invention relates to charting on a single trend line vibration data of the same type that is acquired under different conditions.

INTRODUCTION

Vibration data is an important parameter to collect, record, and analyze in machine health science. The vibration produced by a given machine, such as a rotating machine, can indicate to a skilled engineer whether the machine is operating correctly, and if not, can also provide important information as the exact nature of a given problem.

However, vibration information can appear to be quite different over time, and questions arise as to whether the differences in the data represent a problem with the machine or just a difference in the conditions under which the data was collected.

For example, consider the case of a vibration sensor mounted on a pump. If the pump is pumping water, then the vibration data will tend to be at a certain average level. However, if the fluid being pumped changes to a lightweight oil, then the vibration data will shift to a different average level. In a similar way, if the fluid changes to a heavy-weight sludge, then the vibration data will shift to yet another average level. In each case the operation of the pump might be perfectly acceptable, but the changes in the vibration data due to the changing conditions will tend to obfuscate that fact.

This is not the only condition that can affect the vibration data. If the setup of the sensor changes, such as by changing the maximum frequency range of the sensor, then the collected vibration data will often look quite different, even though nothing about the operation of the pump has changed. For example, in a lower vibration range setup, the sensor might have been clipping the data. Alternately, in a higher range setup, a loss of resolution might cause the vibration data to look different.

These are just two examples of how vibration data of the same type can appear to be quite different under different conditions. In actual implementation, there are many other factors that can change the appearance of vibration data, when in reality nothing detrimental has occurred to the condition of the monitored machine.

There might be some kind of record kept to distinguish data that is received under such different conditions, so that the engineer can tell what has changed by going back through the data logs. In many instances, however, there will not be, and no record of why the change occurred will be kept at all.

Sometimes when vibration data is gathered under different conditions, it is placed in different data sets. When such data is charted, it produces plots such as given in FIGS. 4-6. Each of the charts 400, 500, and 600 are plots of the same type of data, such as the 1× turning speed of the machine, but the data is received under different conditions. So, for example, data received under condition 110, as depicted in chart 400 of FIG. 4, is plotted at a relatively high value as depicted in trend line 402*a*. Condition 110 persists for a given period of time, and then the conditions change to condition 112, as given in FIG. 5, and the data is plotted at a relatively lower level as depicted in chart 500 by trend line 502. Then conditions change again to condition 114, as given in FIG. 6, and the data is plotted in chart 600 at a relatively intermediate level as trend line 602. Finally, conditions return to condition 110, which is plotted again on chart 400 as trend line 402*b*, as depicted in FIG. 4.

At each level of the vibration data, certain analyses can be performed. For example, the data can be plotted against either statistically computed alert limits or input alert limits or alert limits, as depicted by 404, 504, and 604.

However, perhaps even more difficult to interpret is when the data that is gathered under different conditions is plotted on the same chart without any indication of why the data suddenly looks different. When the data in the trend line spikes up or down in such a situation, the engineer has to search through the data logs to determine if there is something wrong with machine, or if the data-gathering conditions changed, assuming such data logs even exist.

All of this makes reviewing the data relatively difficult to do, because the engineer does not know why a trend line suddenly stops or spikes on the chart that he is inspecting. This is a time-consuming and, often, error-prone process.

What is needed, therefore, is a system that tends to reduce issues such as those described above, at least in part.

SUMMARY

The above and other needs are met by a computerized apparatus for presenting as a single trend line on a chart the vibration data that is read under different conditions. A sensor measures vibration and produces vibration data. A memory stores the vibration data, an indicator of the condition under which the vibration data was produced, and a type associated with the vibration data. A processor reads the vibration data, the condition, and the type from the memory, and selectively plots the vibration data on the trend line when the type of the vibration data matches a given value, even though the condition might be different from data point to data point on the trend line. The processor selectively creates a flag indicating a condition change, and an interface presents a plot of the trend line, and the flag when a condition change occurs between data points.

In various embodiments according to this aspect of the invention, the processor is further adapted to compute statistical alert limits for the trend line, and the interface is further adapted to present the statistical alert limits. In some embodiments, separate statistical alert limits are computed and presented for data points associated with different conditions. In some embodiments, the processor is further adapted to retrieve from the memory alert limits for the trend line, and the interface is further adapted to present the alert limits. In some embodiments, separate alert limits are retrieved and presented for data points associated with different conditions. In some embodiments, the sensor is disposed remotely from the memory, processor, and interface. In some embodiments, the sensor is disposed in the same apparatus as the memory and processor.

According to another aspect of the invention there is described a method for presenting as a single trend line on a chart the vibration data that is read under different conditions. Vibration is read and vibration data is produced with a sensor. A memory stores the vibration data, an indicator of the condition under which the vibration data was produced, and a type associated with the vibration data. A processor reads the vibration data, the condition, and the type from the memory, and selectively plots the vibration data on the trend line when the type of the vibration data matches a given value, even though the condition might be different from data point to data point on the trend line. The processor selectively creates a flag indicating a condition change. An interface presents the plot of the trend line, and the flag when a condition change occurs between data points.

In some embodiments according to this aspect of the invention, the processor computes statistical alert limits for the trend line, and the statistical alert limits are presented with the interface. In some embodiments, separate statistical alert limits are computed and presented for data points associated with different conditions. In some embodiments, alert limits for the trend line are retrieved from the memory, and the alert limits are presented with the interface. In some embodiments, separate alert limits are retrieved and presented for data points associated with different conditions. In some embodiments, the sensor is disposed remotely from the memory, processor, and interface. In some embodiments, the sensor is disposed in a common apparatus with the memory and processor.

According to yet another aspect of the invention, there is described a non-transitory, computer-readable storage medium having stored thereon a computer program with a set of instructions for causing a computer to present as a single trend line on a chart the vibration data that is read under different conditions, by performing the following steps. Vibration is measured and vibration data is produced with a sensor. A memory stores the vibration data, an indicator of the condition under which the vibration data was produced, and a type associated with the vibration data. A processor reads the vibration data, the condition, and the type from the memory, and selectively plots the vibration data on the trend line when the type of the vibration data matches a given value, even though the condition might be different from data point to data point on the trend line. The processor selectively creates a flag indicating a condition change, and an interface presents a plot of the trend line, and the flag when a condition change occurs between data points.

In some embodiments according to this aspect of the invention, statistical alert limits for the trend line are computed with the processor, and the statistical alert limits are presented with the interface. In some embodiments, separate statistical alert limits are computed and presented for data points associated with different conditions. In some embodiments, alert limits are retrieved for the trend line from the memory, and the alert limits are presented with the interface. In some embodiments, separate alert limits are retrieved and presented for data points associated with different conditions.

DRAWINGS

Further advantages of the invention are apparent by reference to the detailed description when considered in conjunction with the figures, which are not to scale so as to more clearly show the details, wherein like reference numbers indicate like elements throughout the several views, and wherein.

DESCRIPTION

Figure 1:
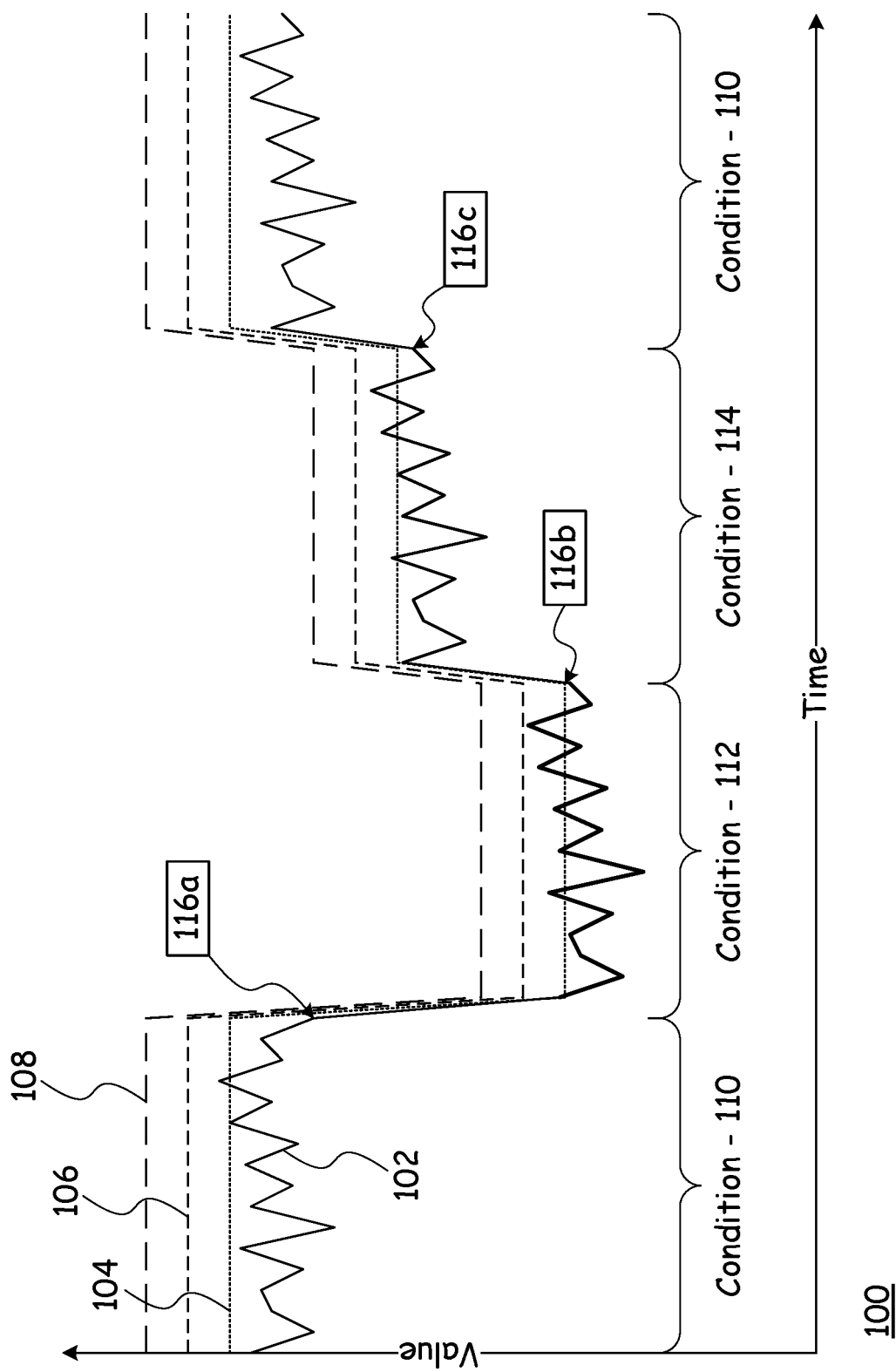
FIG. 1 is a graph of data captured under conditions that is all presented on a single plot line, according to an embodiment of the present invention.

With reference now to FIG. 1, there is depicted a graph 100 where time is increasing along the X axis and the magnitude of the value of the reading, such as vibration, is increasing along the Y axis. A trend line 102 is depicted within the plot 100, where the trend line 102 represents (over time) three different sets of conditions 110, 112, and 114. However, the underlying reading that is plotted is semantically the same across all of the different conditions, in that it is of the same type of reading—such as the 1× turning speed.

In the prior art charts 400, 500, and 600, the readings for the different conditions 110, 112, and 114 were plotted with different trend lines 402, 502, and 602, not with a single trend line 102. Thus, each of the separate trend lines 402, 502, and 602—one each associated with one each of the different conditions 110, 112, and 114—had gaps representing those times when the given condition did not associate with that given trend line.

The various limits for notice 104, alert 106, and alarm 108 are separately computed or plotted on the chart 100 according to the data within that section of the chart 100. Therefore, these limits 104, 106, and 108 can change with each set of conditions 110, 112, and 114, as depicted. Thus, the entire presentation of data is easier to follow, and the engineer need not continually check the data log and go to different charts to see the history of the machine.

Thus, measurements that are different in the conditions 110, 112, and 114 under which they were acquired, but are of the same type, are plotted on the same trend line 102. The portions of the plot line 102 that are associated with the various conditions 110, 112, and 114 can be differentiated one from another in one or more of a variety of different ways, which are generically referred to as flags or flagging herein.

For example, one form of a flag is for different portions of the trend line 102 to be plotted in a different line style or color. Another form of a flag is for identifying and descriptive information 116 about each condition 110, 112, and 114 to optionally be place in a tag 116 and displayed on the plot 100. For example, in one embodiment, each of the tags 116 can indicate the specific condition 110, 112, and 114 for the portion of the trend line 102 that immediately follows the tag 116, so that the engineer can readily see the condition 110, 112, and 114 that produced the change in the trend line 102. Other types of flags and flagging are also contemplated herein.

Figure 2:
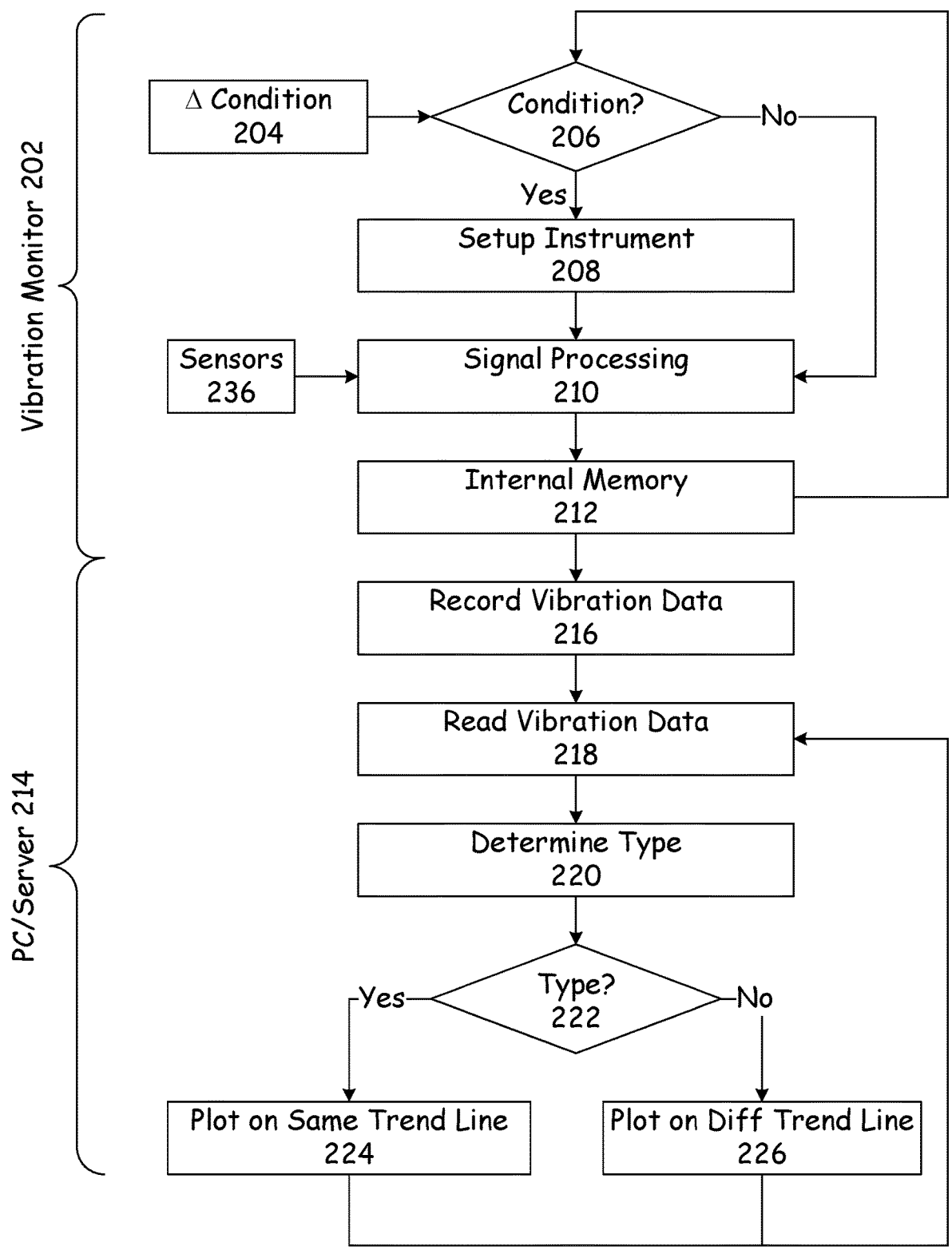
FIG. 2 is a flow chart of a method for presenting data captured under different conditions on a single plot line, according to an embodiment of the present invention.

With reference now to FIG. 2, there is depicted a flow chart for a method 200 for producing the plot 100 of FIG. 1. As given in block 204, the condition 110, 112, and 114 of the data acquisition might change, as introduced above. For example, the user might have made a change to the measurement instrument or the operation of the machine might have changed in some way. Block 206 then determines whether the conditions have changed from those of the previous readings. If they have, then the method falls to block 208, where the instrument is setup for the new conditions 110, 112, and 114, such as to record the particulars about the new condition 110, 112, and 114. After the setup in block 208, or if no change to the setup is required as determined in block 206, the method falls to block 210, where vibration information is received from the vibration sensors as given in block 236, and the vibration information is processed as given in block 210. The vibration information is then stored in an internal memory, as given in block 212. In some embodiments, all of the preceding steps are performed within a vibration monitoring instrument 202.

In some embodiments the vibration information is then passed along to a computing device, such as a personal computer or a server 214, in which the balance of the method 200 is performed. However, in other embodiments, all of the steps as depicted in method 200 are performed in a common instrument 202 or computing device 214.

As depicted, the vibration information is passed to the server 214, which records the vibration data and other information in a database, as given in block 216. Other information that might get written to the database includes, for example, the type of measurement and the condition 110, 112, and 114 associated with the vibration data point. At some point in time, either immediately or sometime thereafter, the vibration data is read back out of the database, as given in block 218, and then in block 220 the measurement type associated with the data is determined. For example, whether this data point is the 1× turning speed of the machine, or something else.

If the data type is the same as the preceding data, as determined in block 222, then the data is plotted on the same trend line 102, as given in block 224. If the data is not of the same type as the preceding data, then it is plotted on a different trend line, as given in block 226. Regardless of how the vibration information is plotted, as given in either block 224 or 226, the method then returns to block 218, where a new measurement value is read for plotting.

The determination of the type that is associated with the data value is an aspect of the invention that enables the present system to plot on the same graph 100 data that is taken under different conditions 110, 112, and 114, as depicted in FIG. 1. This part of the system is what filters everything that is intrinsically the same type of reading—regardless of the condition 110, 112, and 114 under which the reading is taken—to the same chart 100, and plot it on the same trend line 102. The tags 116 are also optionally depicted on the chart 100, so as to alert the engineer to the changed conditions under which the subsequent readings were taken. These tags 116 can, for example, contain the information that is also stored in a log, but by placing the tags 116 directly on the chart 100, the engineer is freed from having to go look up in the log the cause for the shift in the trend line 102.

Also, by knowing that the conditions 110, 112, and 114 have changed, but the reading type has not changed, the statistical alert lines or alert lines 104, 106, and 108 can be appropriately computed and plotted on the chart 100, because only those readings that are taken under similar conditions 110, 112, and 114 are used in the calculation of the alert limits, or alternately, the appropriate alert limits are only plotted for those portions of the trend line 102 to which they apply, as determined by the condition 110, 112, and 114 associated with the underlying vibration data. The proper placement of such lines 104, 106, and 108 can also serve as a type of flag or flagging. As the lines 104, 106, and 108 change on the graph 100 along the trend line 102, the engineer is alerted to the fact that a change in the conditions 110, 112, and 114 has occurred.

Figure 3:
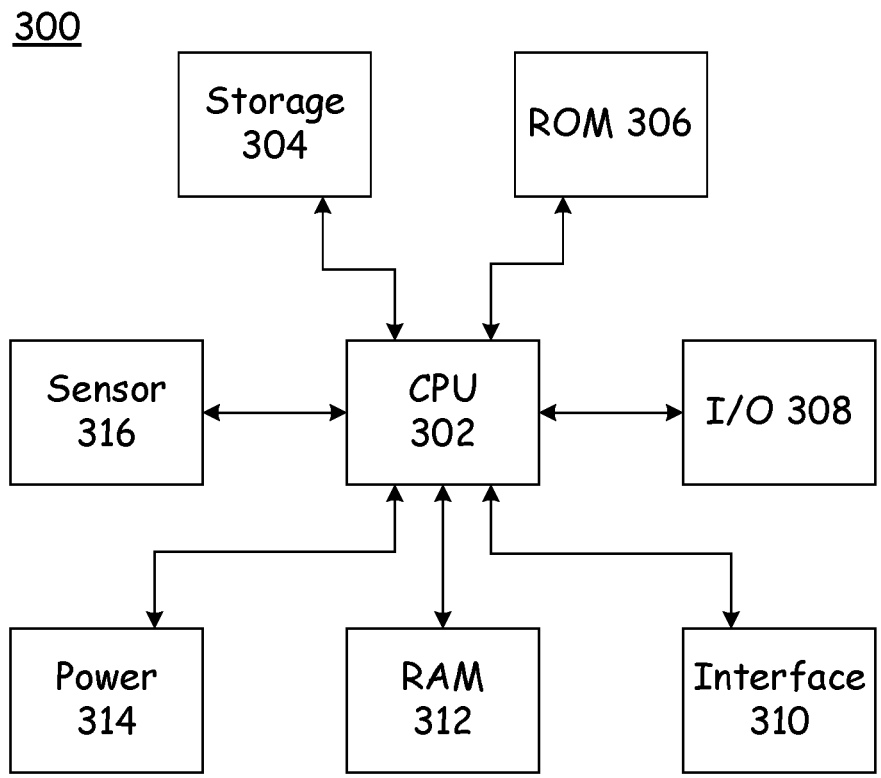
FIG. 3 is a function block diagram of an apparatus for presenting data captured under different conditions on a single plot line, according to an embodiment of the present invention.
Figure 4:
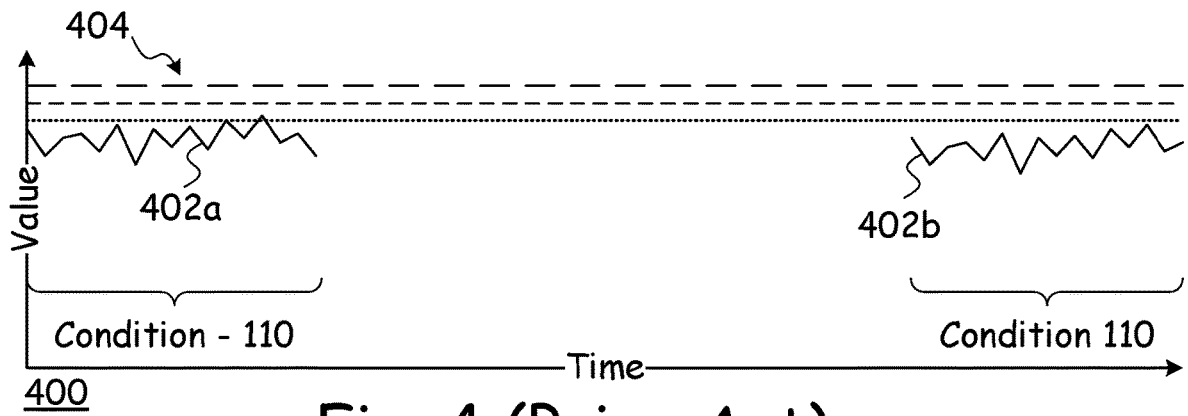
FIG. 4-6 depict graphs of data captured under different conditions on multiple plot lines, according to the prior art.
Figure 5:
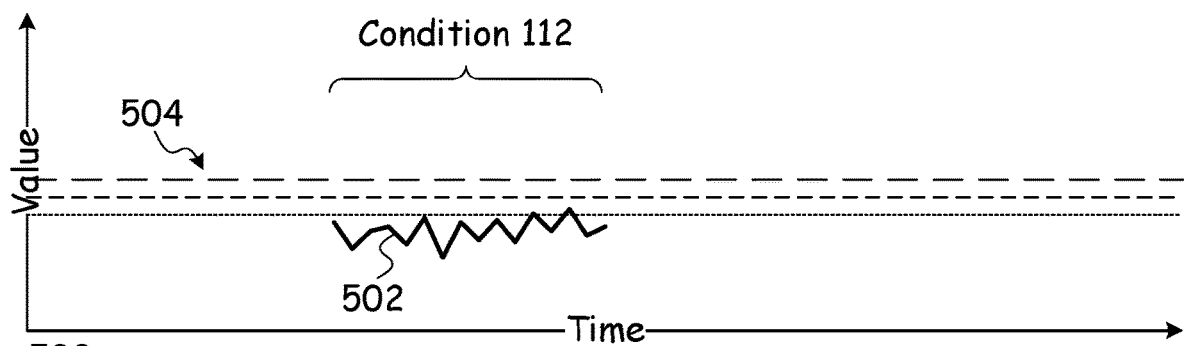
Figure 6:
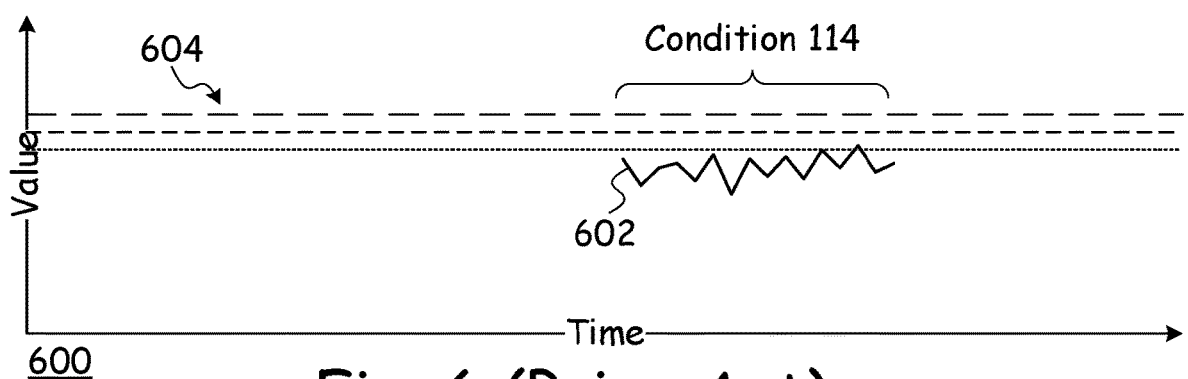

With reference now to FIG. 3, there is depicted one embodiment of a computerized apparatus 300 capable of performing the actions as described herein. In this embodiment, the apparatus 300 is locally under the control of the central processing unit 302, which controls and utilizes the other modules of the apparatus 300 as described herein. As used herein, the word module refers to a combination of both software and hardware that performs one or more designated function. Thus, in different embodiments, various modules might share elements of the hardware as described herein, and in some embodiments might also share portions of the software that interact with the hardware.

The embodiment of apparatus 300 as depicted in FIG. 3 includes, for example, a storage module 304 such as a hard drive, tape drive, optical drive, or some other relatively long-term data storage device. A read-only memory module 306 contains, for example, basic operating instructions for the operation of the apparatus 300. An input-output module 308 provides a gateway for the communication of data and instructions between the apparatus 300 and other computing devices, networks, or data storage modules. An interface module 310 includes, for example, keyboards, speakers, microphones, cameras, displays, mice, and touchpads, and provides means by which the engineer can observe and control the operation of the apparatus 300.

A random-access memory module 312 provides short-term storage for data that is being buffered, analyzed, or manipulated and programming instructions for the operation of the apparatus 300. A power module 314 is also provided in various embodiments of the apparatus 300. In some embodiment that power module 314 is a portable power supply, such as one or more batteries. In some embodiments the power module 314 includes a renewable source, such as a solar panel or an inductive coil that are configured to provide power or recharge the batteries. In other embodiments the power module 314 receives power from an external power source, such as a 110/220 volt supply.

Some embodiments of the apparatus 300 include the vibration sensor 316, which senses vibration from the rotating equipment and provides the vibration signal representing the sensed vibration. For example, an amplified accelerometer is used as the sensor 316 in some embodiments.

In one embodiment, the apparatus 300 receives stored waveform data through the input/output 308. In other embodiments, the apparatus 300 receives waveform data from the vibration sensor 316. In either embodiment, the apparatus 300 performs the functions as described herein, and then sends the data out through the input/output 308 for remote storage or further processing, or directly to the storage module 304. In some embodiments the steps of the method as described herein are embodied in a computer language on a non-transitory medium that is readable by the apparatus 300 of FIG. 3, and that enables the apparatus 300 to implement the process as described herein.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A computerized apparatus for presenting as a single trend line on a chart vibration data that is measured under different conditions, the apparatus comprising:

a sensor adapted to measure vibration and produce vibration data, a memory for storing the vibration data, indicators of the different conditions under which the vibration data was produced, and a type associated with the vibration data, a processor adapted to, read the vibration data, the different conditions, and the type from the memory, selectively plot the vibration data on the trend line when the type of the vibration data matches a given value, even though the different conditions might be different from data point to data point on the trend line, compute separate statistical alert limits for the trend line, and present for data points associated with the different conditions, wherein the statistical alert limits change with each different conditions, selectively create a plurality of flags indicating the different conditions change, and an interface adapted to present a plot of the trend line, and the flags when the different conditions change occur between data points.

2. The computerized apparatus of claim 1, wherein the processor is further adapted to retrieve from the memory the statistical alert limits for the trend line, and the interface is further adapted to present the statistical alert limits.

3. The computerized apparatus of claim 2, wherein the separate statistical alert limits are retrieved and presented for data points associated with the different conditions.

4. The computerized apparatus of claim 1, wherein the sensor is disposed remotely from the memory, processor, and interface.

5. The computerized apparatus of claim 1, wherein the sensor is disposed in the same apparatus as the memory and processor.

6. A method for presenting vibration data that is read under different conditions as a single trend line on a chart, the method comprising the steps of:

measuring vibration and producing vibration data with a sensor, storing in a memory the vibration data, indicators of the different conditions under which the vibration data was produced, and a type associated with the vibration data, reading with a processor the vibration data, the different conditions, and the type from the memory, selectively plotting with the processor the vibration data on the trend line when the type of the vibration data matches a given value, even though the different conditions might be different from data point to data point on the trend line, computing separate statistical alert limits for the trend line, and presenting for data points associated with the different conditions, wherein the statistical alert limits change with each different conditions, selectively creating with the processor a plurality of flags indicating the different conditions change, and presenting with an interface a plot of the trend line, and the flags when the different conditions change occur between data points.

7. The method of claim 6, further comprising retrieving the statistical alert limits for the trend line from the memory, and presenting the statistical alert limits with the interface.

8. The method of claim 7, wherein the statistical separate alert limits are retrieved and presented for data points associated with the different conditions.

9. The method of claim 6, wherein the sensor is disposed remotely from the memory, processor, and interface.

10. The method of claim 6, wherein the sensor is disposed in a common apparatus with the memory and processor.

11. A non-transitory, computer-readable storage medium having stored thereon a computer program comprising a set of instructions for causing a computer to present vibration data that is read under different conditions as a single trend line on a chart by performing the steps of:

measuring vibration and producing vibration data with a sensor, storing in a memory the vibration data, indicators of the different conditions under which the vibration data was produced, and a type associated with the vibration data, reading with a processor the vibration data, the different conditions, and the type from the memory, selectively plotting with the processor the vibration data on the trend line when the type of the vibration data matches a given value, even though the different conditions might be different from data point to data point on the trend line, computing separate statistical alert limits for the trend line, and presenting for data points associated with the different conditions, wherein the statistical alert limits change with each different conditions, selectively creating with the processor a plurality of flags indicating the different conditions change, and presenting with an interface a plot of the trend line, and the flags when the different conditions change occur between data points.

12. The storage medium of claim 11, further comprising retrieving the statistical alert limits for the trend line from the memory, and presenting the statistical alert limits with the interface.

13. The storage medium of claim 11, wherein the statistical separate alert limits are retrieved and presented for data points associated with the different conditions.

* * * * *